United States Patent [19]

Jovanovich et al.

[11] Patent Number: 5,703,950

[45] Date of Patent: Dec. 30, 1997

[54] METHOD AND APPARATUS FOR CONTROLLING COUNTRY SPECIFIC FREQUENCY ALLOCATION

[75] Inventors: Alan F. Jovanovich, Des Moines; Bruce G. Warren, Poulsbo; Duane G. Charron, Marysville; Steven B. Duke, Bothell, all of Wash.

[73] Assignee: Intermec Corporation, Everett, Wash.

[21] Appl. No.: 497,698

[22] Filed: Jun. 30, 1995

[51] Int. Cl.[6] .................................................... H04L 9/32
[52] U.S. Cl. .................................................. 380/23; 379/63
[58] Field of Search .................................. 380/23; 379/63

[56] References Cited

U.S. PATENT DOCUMENTS

| | | | |
|---|---|---|---|
| 5,077,790 | 12/1991 | D'Amico et al. | 380/23 |
| 5,150,412 | 9/1992 | Maru | 380/23 X |
| 5,392,356 | 2/1995 | Konno et al. | 380/23 |
| 5,412,718 | 5/1995 | Narasimhalu et al. | 380/4 |

*Primary Examiner*—Gilberto Barrón, Jr.
*Attorney, Agent, or Firm*—Graham & James LLP

[57] ABSTRACT

A secure communication system is provided for transmitting a country specific frequency allocation in encrypted form between a host processor and a remote device. The secure communication system comprises a host processor and a remote device capable of communicating with the host processor over a communication link. The host processor has a plurality of stored data sets and a predefined encryption algorithm. Each one of the stored data sets comprises a country specific frequency allocation. The remote device has a unique identifier code and also has the predefined encryption algorithm. Responsive to the unique identifier code, the host processor provides a selected one of the plurality of data sets in encrypted form by utilizing the predefined encryption algorithm. The unique identifier code provides an encryption key for the predefined encryption algorithm. The remote device then decrypts the encrypted data set using the predefined encryption algorithm with the identifier code as a decryption key.

18 Claims, 2 Drawing Sheets

METHOD AND APPARATUS FOR CONTROLLING COUNTRY SPECIFIC FREQUENCY ALLOCATION

BACKGROUND OF THE INVENTION

1. Field of the Invention

The present invention relates to control over allocation of country specific frequencies within an RF device, and more particularly, to an embedded digital encryption key within an RF device that permits secure software programmable frequency allocation.

2. Description of Related Art

Most industrialized countries have governmental regulations that authorize use of certain radio frequencies or radio frequency (RF) channels by particular types of radio-communication services or users under specified conditions. Such governmental regulations are considered necessary to control orderly usage of the limited band of RF frequencies, reduce interference between competing radio-communication services, and also to ensure that certain frequencies are reserved for strictly governmental purposes, e.g., police, fire department, paramedical, military, air traffic control, etc. The regulations typically require the manufacturer of an RF transmitting device to take reasonable measures to ensure compliance by the end user of the device.

Traditionally, RF device manufacturers specifically designed their products to operate only within the assigned frequencies, and not within any non-assigned frequencies. Frequency synthesis within such RF devices is easily achieved through use of specifically tuned oscillators, such as crystal oscillators, that can only operate at the tuned frequency or set of frequencies. The tuned oscillators are exceptionally frequency stable, and also are rather difficult to modify. An end user of such an RF device could not easily alter the device to operate at any non-assigned frequency. As a result, compliance by the end user with the regulations is generally assured.

This hardware-based solution to the frequency assignment issue presents a significant problem to manufacturers that market RF devices to customers located within several countries. Since the regulatory frequency assignments are not standardized among various countries, and are actually conflicting in many cases, a manufacturer must produce a different and somewhat unique version of the RF device for each country in which the device will ultimately operate. This significantly increases the manufacturing and distribution cost of the RF device. Moreover, the RF devices are considerably inflexible to changed operating conditions, such as necessitated by governmental changes in frequency assignment or user desired frequency changes to avoid other interfering RF emitters. To alter the operating frequency, the RF device generally has to be returned to the manufacturer for retuning.

To simplify the retuning process, software tunable synthesizers were developed. In a Software tunable RF device, a programmable memory within the RF device stores data values that are used to control the output frequency of an oscillator, such as a voltage controlled oscillator (VCO). The programmable memory may include certain types of non-volatile storage devices, including erasable programmable read only memory (EPROM), electronically erasable programmable read only memory (EEPROM), and so-called "flash" memory. In the event that it becomes necessary to retune an RF device, the manufacturer can simply alter the data values stored within the programmable memory. This retuning process can be accomplished remotely using conventional telephone lines, eliminating the need to return the device to the manufacturer. The relative ease of retuning, however, also increases the risk that an end user will unilaterally alter the stored data values and retune the RF device to a non-assigned frequency. Thus, the manufacturer cannot ensure compliance of its products with the local regulations, and as a result, may be subject to certain fines and/or penalties that result from intentional or inadvertent non-compliance by the end user.

Accordingly, a critical need exists to provide a radio-communication system having the inherent security of a hardware-based frequency synthesis with the convenience of a software programmable frequency synthesizer. Such a desirable radio-communication system would enable a manufacturer to remotely retune the RF device as necessary, while precluding unauthorized retuning by the end user of the device.

SUMMARY OF THE INVENTION

In accordance with the teachings of the present invention, a secure communication system is provided for transmitting an encrypted data set between a host processor and a remote device. The encrypted data set comprises the country-specific frequency information for operating the remote device within a particular country. The secure communication system allows retuning of the remote device by modifying the stored frequency information under the control of the host processor, and prevents unauthorized modification of the stored frequency information.

More particularly, the secure communication system comprises a host processor and a remote device capable of communicating with the host processor over a communication link. The host processor has a plurality of stored data sets and a predefined encryption algorithm. The remote device has a unique identifier code and also has the predefined encryption algorithm. Responsive to the unique identifier code, the host processor provides a selected one of the plurality of data sets that corresponds to the unique identifier code in encrypted form by utilizing the predefined encryption algorithm. The unique identifier code provides an encryption key for the predefined encryption algorithm. The remote device then decrypts the encrypted data set using the predefined encryption algorithm with the identifier code as a decryption key.

The present invention further provides a method for transmitting an encrypted data set between a host processor and a remote system, in which the remote system has a unique identifier code and each of the host processor and the remote system have a predefined encryption algorithm. The remote system transmits the identifier code to the host processor. The host processor then selects the data set appropriate for the remote system based on operator input, and encrypts the selected data set using the predefined encryption algorithm with the identifier code as an encryption key. Finally, the encrypted data set is transmitted from the host processor to the remote system, and decrypted using the predefined encryption algorithm with the identifier code as a decryption key.

A more complete understanding of the method and apparatus for controlling country specific frequency allocation will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Figure 1:
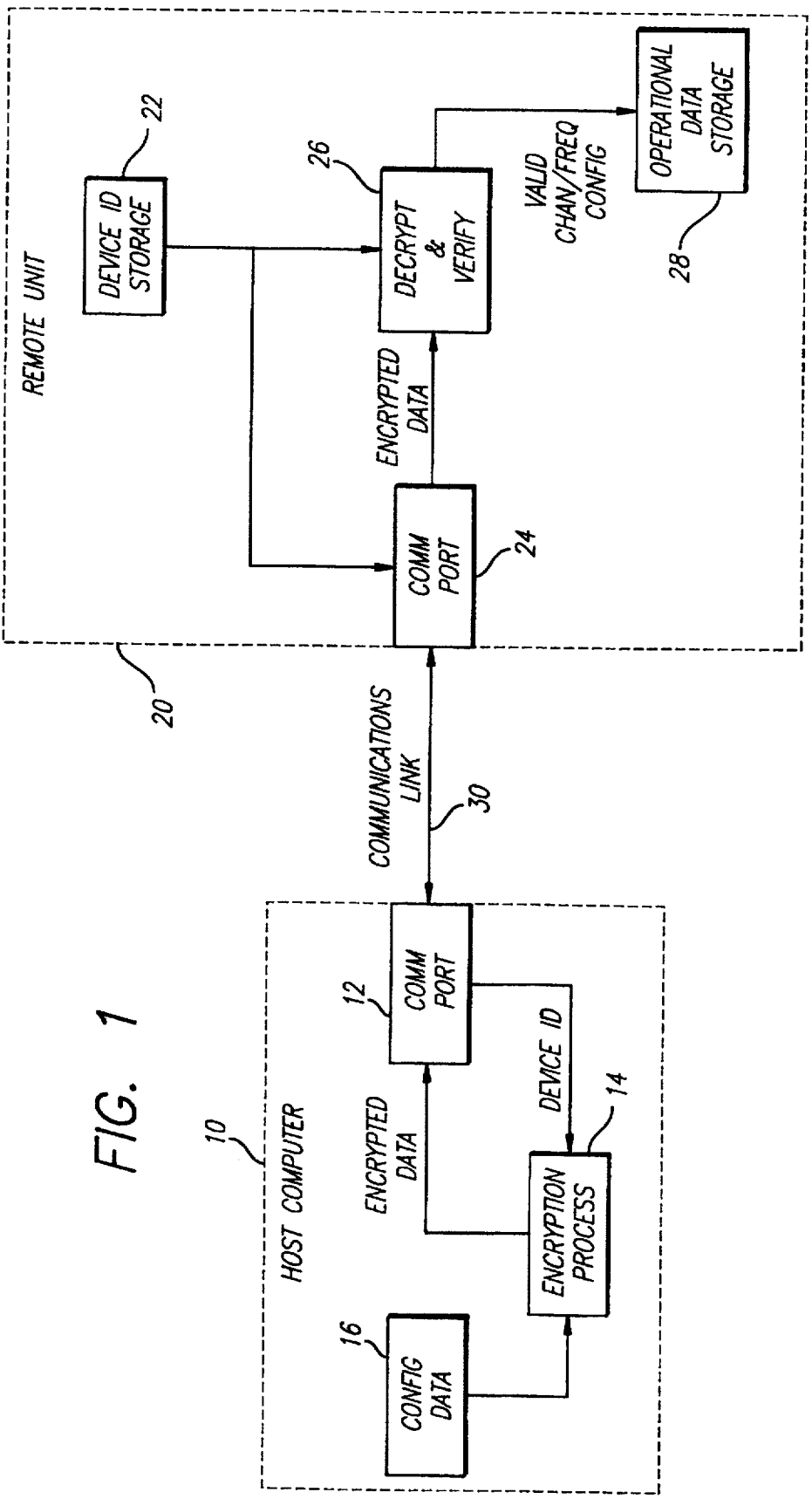
FIG. 1 is a block diagram illustrating a secure apparatus for controlling operating frequency assignment in accordance with the present invention.

The present invention satisfies the critical need for a radio-communication system having the inherent security of a hardware-based frequency tuned synthesizer with the convenience of a software programmable frequency tuned synthesizer. The radio-communication system of the present invention enables a manufacturer to remotely retune the RF device as necessary, while precluding unauthorized retuning by the end user of the device. In the description that follows, like reference numerals are utilized to identify like elements in each of the figures.

Referring first to FIG. 1, a block diagram of a secure apparatus for controlling operating frequency assignment in accordance with the present invention is illustrated. The apparatus includes a host computer 10 and a remote unit 20. It is anticipated that the host computer 10 be located at a central manufacturing facility or technical support center. The host computer 10 includes a data storage capacity that keeps track of the field location of all remote devices, and maintains records regarding the allowable operating frequencies that are permissible for remote devices in operation in the countries of interest. The host computer 10 may operate autonomously, or may require a human operator to control certain operations.

The remote unit 20 may comprise either a radio-communication system or element of a radio-communication system that is intended to operate at a location remote from the host computer 10, such as in a foreign country. The remote unit 20 would be operated by a user or customer to transmit data or information over one or more controlled RF frequencies. For example, the remote unit 20 may be an element of a wireless local area network (LAN) operating over one or more RF channels. Ordinarily, the remote unit 20 would be entirely independent of the host computer 10, but may occasionally communicate with the host computer as necessary to receive certain technical support, such as software revisions and updates, or to modify the stored operating frequency information.

A communications link 30 can be established between a communication port 12 of the host computer 10, and a communication port 24 of the remote unit 20. In the preferred embodiment, the communications link 30 is a conventional serial data communications link operable over a commercial telephone line, though it should be apparent that other more sophisticated types of communications links are also possible, such as microwave or satellite communications links.

The host computer 10 further includes an encryption processing unit 14 and a configuration data storage/processing unit 16. The configuration data storage/processing unit 16 stores or compiles the frequency configuration data for all of the possible remote units 20. In particular, the configuration data storage/processing unit 16 may comprise a database that stores data regarding the allowable operating frequencies for all of the countries in which the remote units may be operating. The configuration data storage/processing unit 16 may further include processing capability to generate specific data sets containing configuration data for a particular type of remote unit, taking into account the anticipated use for the remote unit and the geographic location of the remote unit. As described in greater detail below, the encryption processing unit 14 receives a Device ID code transmitted from the remote unit 20 across the communication link 30, and encrypts the selected configuration data using the Device ID as an encryption key.

The remote unit 20 further includes a Device ID storage unit 22, a decrypt/verification unit 26 and an operational data storage unit 28. The operational data storage unit 28 is a non-volatile memory device in which the configuration data is stored. During normal usage of the remote unit 20 (i.e., the remote unit performing operational radio-communication system tasks and not communicating with the host computer 10), the remote unit uses the configuration data stored within the operational data storage unit to tune the internal synthesizer in order to select operational radio frequency channels. The Device ID storage unit 22 also comprises a non-volatile memory device that stores an alphanumeric code that is unique for the remote unit 20, referred to herein as the Device ID. The decrypt/verification unit 26 receives encrypted configuration data from the host computer 10 across the communications link 30, decrypts the data using the Device ID as an decryption key, and transfers the configuration data to the operational data storage unit 28.

Figure 2:
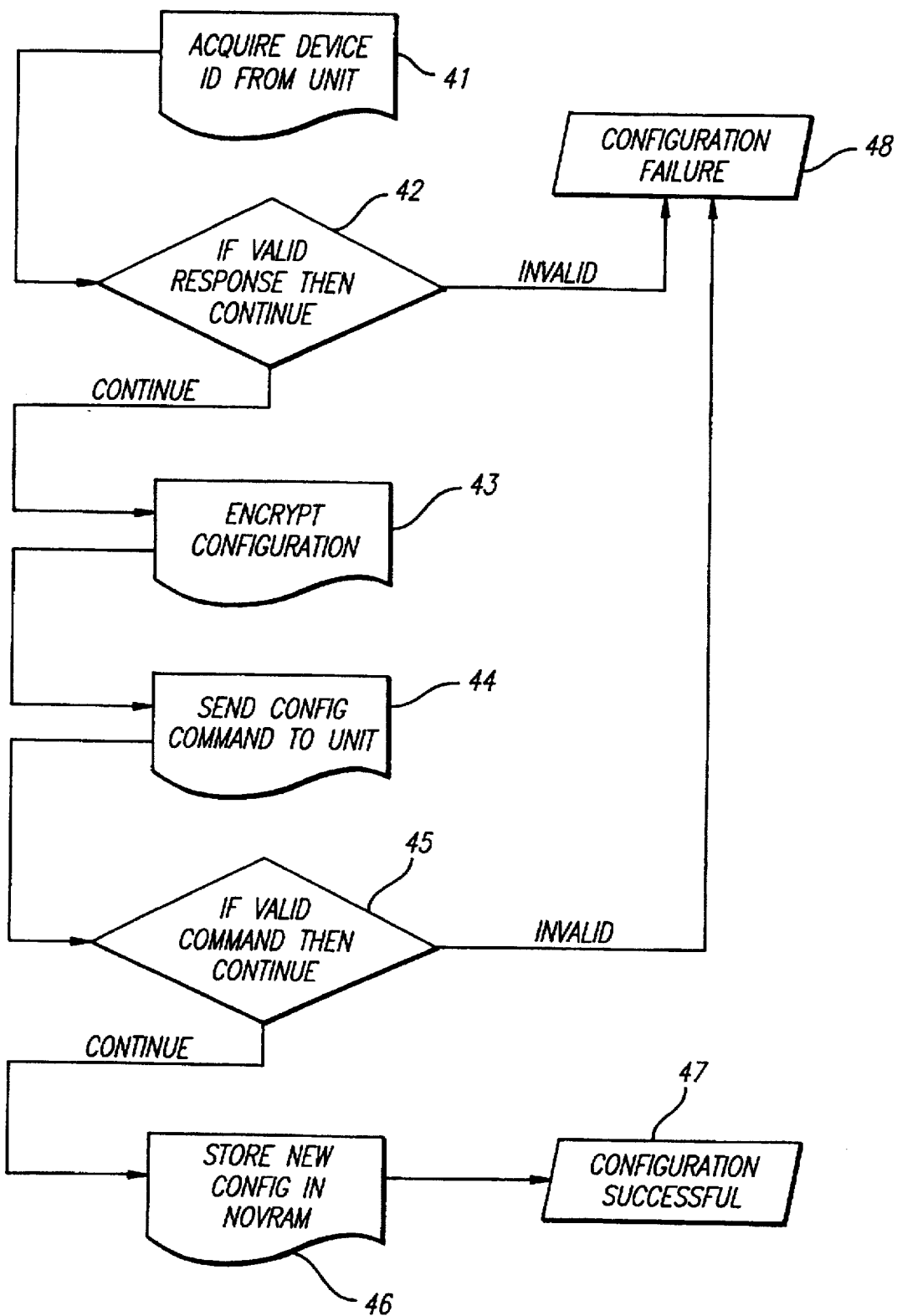
FIG. 2 is a flow chart illustrating a method for controlling operating frequency assignment.

Operation of the apparatus of FIG. 1 will now be described with reference to the flow chart of FIG. 2. At step 41, the Device ID is acquired by the host computer 10 from the remote unit 20, by transferring the Device ID from the Device ID storage unit 22, through the communication port 24, across the communications link 30, through the communication port 12 to the encryption processing unit 14. At step 42, the encryption processing unit 14 verifies the authenticity of the Device ID. In one possible method of verification, an operator checks the Device ID against stored information regarding the remote unit. For example, the host computer 10 may maintain records that reflect the particular operating location of the remote unit that can be used as a cross-reference to ensure the authenticity of the Device ID. If the encryption processing unit 14 determines that the Device ID is not authentic, then there is a configuration failure at step 48 and communication with the remote unit 20 across the communication link 30 is terminated.

Conversely, if the encryption processing unit 14 determines that the Device ID is authentic, then the configuration data for the particular remote unit 20 is selected and encrypted at step In this step, the configuration data is provided from the configuration data storage/processing unit 16 to the encryption processing unit 14, which encrypts the configuration data using the Device ID as an encryption key. Once the configuration data is encrypted, it is transmitted at step 44 back across the communication link 30 to the decrypt/verification unit 26. The decrypt/verification unit 26 decrypts the configuration data using the Device ID as a decryption key, and analyzes the decrypted configuration data at step 45 to verify that it is valid for the particular remote unit. If for some reason the configuration data is not valid, there is a configuration failure at step 48 and communication with the remote unit 20 is terminated. Instead, if the configuration data is determined to be valid, then it is transferred into the operational data storage unit 28. This signifies the successful transfer of the configuration data, which terminates the process at step 47.

There are numerous known, commercial algorithms for encrypting the configuration data that can be implemented within the host computer 10 and the remote unit 20. An example of a simple encryption algorithm is given below for an exemplary eight channel country frequency assignment. Table 1 illustrates a possible frequency assignment having eight channels ranging from 2.4062 GHz to 2.4500 GHz, with successive channels increasing in 0.625 MHz increments. An index value ranging from 1 to 8 provides a multiplier that determines the final channel frequency. To allocate some or all of these channel numbers, the appropriate index value for each channel is transmitted from the host computer 10 to the remote unit 20, and the decrypt/verification unit 26 converts the transmitted index value into the appropriate frequency values.

TABLE 1

| CHANNEL NO. | FREQUENCY | INDEX | DETERMINATION |
|---|---|---|---|
| 0 | 2.4062 GHz | 1 | 2.4 GHz + (1 * .625 MHz) |
| 1 | 2.4125 GHz | 2 | 2.4 GHz + (2 * .625 MHz) |
| 2 | 2.4187 GHz | 3 | 2.4 GHz + (3 * .625 MHz) |
| 3 | 2.4250 GHz | 4 | 2.4 GHz + (4 * .625 MHz) |
| 4 | 2.4312 GHz | 5 | 2.4 GHz + (5 * .625 MHz) |
| 5 | 2.4375 GHz | 6 | 2.4 GHz + (6 * .625 MHz) |
| 6 | 2.4437 GHz | 7 | 2.4 GHz + (7 * .625 MHz) |
| 7 | 2.4500 GHz | 8 | 2.4 GHz + (8 * .625 MHz) |

Each of the channel numbers are further represented by predefined, but randomly selected, two-digit hexadecimal values, as illustrated in Table 2. Both the master computer 10 and the remote device 20 are configured to know these predefined values in advance. In this exemplary encryption algorithm, two encoded channel numbers are transmitted together as a four-digit hexadecimal pair. For example, channels 0 and 1 are represented by the single hexadecimal word 141E. The encrypted configuration data is defined by the following equation:

$$new\_word = ((Device\ ID) * (count+1)) * (word-key)$$

where new_word represents an encrypted four-digit hexadecimal value, count represents a sequential value ranging from one to four, word represents the unencrypted four-digit hexadecimal value (such as 141E for channels 0 and 1 described above), and key represents a randomly selected encryption multiplier associated with each count value. In this example, key values for counts one through four are 4050, 3095, 2012, and 1093, respectively. Accordingly, a new_word hexadecimal value for channels 0 and 1 calculated in accordance with the above equation would be 4F81.

TABLE 2

| CHANNEL NO. | HEXADECIMAL PAIR |
|---|---|
| 0 | 14 |
| 1 | 1E |
| 2 | 28 |
| 3 | 32 |
| 4 | 3C |
| 5 | 46 |
| 6 | 50 |
| 7 | 5A |

Thus, the new_words that are transmitted utilize the Device ID as an encryption key, as well as certain predefined random numbers. The random numbers further decrease the likelihood that a user of the remote device could intentionally duplicate the process. After transmission of the new_words, the decrypt/verification unit 26 reverses the encryption process to determine the proper index value for each of the channels. Once each associated index value is known, the proper frequency can be determined as described above.

It is anticipated that some or all of the functional elements within the host processor 10 and remote unit 20 be implemented within software programs operating in the respective devices. Moreover, the encryption algorithm would be encoded to operate within the software programs. This way, the encryption algorithm could be periodically revised by uploading new code across the transmission link 30 from the host processor 10.

Having thus described a preferred embodiment of the method and apparatus for controlling country specific frequency allocation, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A method for transmitting an encrypted data set between a host processor and a remote system, said remote system having a unique identifier cod&, each of said host processor and said remote system having a predefined encryption algorithm, the method comprising the steps of:

transmitting said identifier code from said remote system to said host processor;

selecting a data set appropriate for said remote system;

encrypting said data set using said predefined encryption algorithm with said identifier code as an encryption key;

transmitting said encrypted data set from said host processor to said remote system; and decrypting said encrypted data set using said predefined encryption algorithm with said identifier code as a decryption key.

2. The method of claim 1, further comprising the step of verifying validity of said transmitted identifier code prior to said selecting step.

3. The method of claim 1, further comprising the step of storing said decrypted data set within said remote system.

4. A method for transmitting an encrypted data set between a host processor and a remote system, said remote system having a unique identifier code, each of said host processor and said remote system having a predefined encryption algorithm, the method comprising the steps of:

transmitting said identifier code from said remote system to said host processor;

selecting a data set appropriate for said remote system;

encrypting said data set using said predefined encryption algorithm with said identifier code as an encryption key;

transmitting said encrypted data set from said host processor to said remote system; and decrypting said encrypted data set using said predefined encryption algorithm with said identifier code as a decryption key, wherein said step of selecting a data set further comprises selecting a data set particular to a specific country in which said remote system is intended to operate.

5. The method of claim 1, wherein each of said transmitting steps further comprise transmitting over a serial communication link.

6. The method of claim 1, wherein said step of transmitting said identifier code further comprises transmitting said identifier code in an unencrypted form.

7. The method of claim 1, wherein said step of selecting a data set further comprises selecting a data set through operator input.

8. A secure communication system, comprising:

a host processor having a plurality of stored data sets and a predefined encryption algorithm; and a remote device capable of communicating with said host processor over a communication link, said remote device having a unique identifier code that is communicated to said host processor over said communication Link, said host processor encrypting a selected one of said plurality of data sets utilizing said predefined encryption algorithm and communicating said encrypted data set to said remote device over said communication link, said unique identifier code being used by said host processor as an encryption key for said predefined encryption algorithm.

9. The secure communication system of claim 8, further comprising means within said remote device for decrypting said encrypted data set using predefined encryption algorithm with said identifier code as a decryption key.

10. The secure communication system of claim 8, wherein said communication link further comprises a serial communication link.

11. A secure communication system, comprising:

a host processor having a plurality of stored data sets and a predefined encryption algorithm; and a remote device capable of communicating with said host processor over a communication link, said remote device having a unique identifier code, said host processor encrypting a selected one of said plurality of data sets utilizing said predefined encryption algorithm, said unique identifier code providing an encryption key for said predefined encryption algorithm, wherein said selected one of said data sets further comprises frequency data particular to a specific country in which said remote device is intended to operate.

12. The secure communication system of claim 8, further comprising means within said host processor for verifying validity of said identifier code.

13. A system for providing encrypted data between a host processor and a remote device over a communication channel, comprising:

means for transmitting a unique identifier code to said host processor from said remote device in an unencrypted form;

means for selecting a particular data set from a plurality of stored data sets;

means for encrypting the selected data set using said unique identifier code as an encryption key;

means for transmitting said encrypted data set from said host processor to said remote device; and means for decrypting the encrypted data set using said identifier code as a decryption key.

14. The system of claim 13, further comprising means for verifying validity of said transmitted identifier code.

15. The system of claim 13, further comprising means for storing said decrypted data set within said remote device.

16. A system for providing encrypted data between a host processor and a remote device over a communication channel, comprising:

means for transmitting a unique identifier code to said host processor from said remote device in an unencrypted form;

means for selecting a particular data set from a plurality of stored data sets;

means for encrypting the selected data set using said unique identifier code as an encryption key;

means for transmitting said encrypted data set from said host processor to said remote device; and means for decrypting the encrypted data set using said identifier code as a decryption key, wherein said selecting means further comprises means for selecting a data set particular to a specific country in which said remote system is intended to operate.

17. The system of claim 13, wherein said communication channel further comprises a serial communication link.

18. The system of claim 13, wherein said means for transmitting said identifier code further comprises means for transmitting said identifier code in an unencrypted form.

* * * * *